(12) United States Patent
Comerford

(10) Patent No.: US 7,823,541 B2
(45) Date of Patent: Nov. 2, 2010

(54) CAT TOY

(76) Inventor: Paul Comerford, 38073 Augusta Dr., Murrieta, CA (US) 92563

( * ) Notice: Subject to any disclaimer, the term of this patent is extended or adjusted under 35 U.S.C. 154(b) by 330 days.

(21) Appl. No.: 12/129,974

(22) Filed: May 30, 2008

(65) Prior Publication Data

US 2010/0236496 A1    Sep. 23, 2010

Related U.S. Application Data

(60) Provisional application No. 60/932,503, filed on Jun. 1, 2007.

(51) Int. Cl.
*A01K 29/00* (2006.01)
(52) U.S. Cl. ....................................................... 119/707
(58) Field of Classification Search ................. 119/702, 119/707, 708, 709; 446/227, 236, 242
See application file for complete search history.

(56) References Cited

U.S. PATENT DOCUMENTS

| | | |
|---|---|---|
| 2,307,905 A | 1/1943 | Ament |
| 2,567,600 A | 9/1951 | Gussa |
| 2,673,087 A | 3/1954 | Bacon |
| 2,750,189 A | 6/1956 | Huth |
| 2,833,244 A | 5/1958 | Bohlman |
| 3,097,626 A | 7/1963 | Felten |
| 3,112,109 A | 11/1963 | Young |
| 3,272,507 A | 9/1966 | Grau |
| 3,665,892 A | 5/1972 | Kusisto |
| 3,716,029 A | 2/1973 | Pillsbury, Jr. |
| 3,999,751 A | 12/1976 | Scardino |
| 4,422,257 A | 12/1983 | McCrory |
| 4,517,922 A | 5/1985 | Lind |
| 4,940,018 A | 7/1990 | Edling |
| 5,579,725 A * | 12/1996 | Boshears ................. 119/706 |
| 5,634,435 A * | 6/1997 | Udelle et al. ............. 119/706 |
| 5,806,465 A * | 9/1998 | Baiera et al. ............. 119/707 |
| 5,875,736 A * | 3/1999 | Udelle et al. ............. 119/706 |
| 6,345,593 B1 * | 2/2002 | Stewart et al. ........... 119/706 |
| 6,684,819 B1 * | 2/2004 | Locke ...................... 119/707 |
| 6,939,195 B1 * | 9/2005 | Hunt et al. ............... 446/295 |
| 2002/0094748 A1 * | 7/2002 | Baik ........................ 446/227 |
| 2002/0174839 A1 * | 11/2002 | Horvath .................. 119/707 |

* cited by examiner

*Primary Examiner*—Timothy D Collins
*Assistant Examiner*—Monica Williams
(74) *Attorney, Agent, or Firm*—QuickPatents, Inc.; Kevin Prince

(57) ABSTRACT

A cat toy for resting on a flat surface is disclosed. The cat toy includes a circular shaped housing that contains a motor connected to a power source. A resilient mouse wand is secured at one end thereof with a motor shaft through a gearing arrangement, thrust bearing arrangement, or the like. The mouse wand includes a ball and a tail section at a distal end. A flexible cover partially covers the mouse wand such that the cat can see the ball moving under the cover and the tail section protruding from the edge of the cover. A control circuit is electronically connected between the motor and the power source that causes the motor to change directions and operate at different speeds and erraticity.

9 Claims, 4 Drawing Sheets

CAT TOY

CROSS-REFERENCE TO RELATED APPLICATIONS

This application claims the benefit of U.S. Provisional Patent Application 60/932,503, filed on Jun. 1, 2007, and incorporated herein by reference.

STATEMENT REGARDING FEDERALLY SPONSORED RESEARCH AND DEVELOPMENT

Not Applicable.

FIELD OF THE INVENTION

This invention relates to cat toys, and more particularly to a motorized cat toy that moves erratically under a flexible cover.

DISCUSSION OF RELATED ART

Cats are known to enjoy chasing and playing with small moving objects, and particularly objects that move randomly in various directions. Cat owners typically purchase a variety of toys such as balls and the like for the amusement of their cats. However, most of these do not hold the attention of the cat for very long since they typically do not move on their own or do anything to overtly attract the attention of the cat. Cat toys can help keep cats occupied, exercised, and out of trouble. In addition, cat owners enjoy watching their cats play. For these and other reasons, many cat toys are commercially available at pet stores and other retail outlets. However, the right combination of cat-attracting, and owner-pleasing attributes has remained somewhat elusive. Cats are entertained by moving objects such as balls and simulated mice, etc. In particular, cats seem to be especially attracted to movable things that they can maneuver. Balls of twine and similar round objects that a cat can propel across a floor seem to have special appeal. However, a disadvantage of free-rolling objects is that they frequently tend to pass underneath obstacles such as refrigerators, couches, bookcases and other pieces of furniture, which makes it difficult for either the cat or the owner to retrieve the object, with the result that an interesting game of chase is suddenly terminated.

Several prior art devices are known to provide cat toys that are not easily moved themselves. For example U.S. Pat. No. 4,327,668 issued to Phillips, shows a toy for cats comprising figures of mice moved in slots by rods from underneath a rigid board. This arrangement is awkward for the user, who must place his hands under the baseboard, presumably on the floor. The cat will most likely quickly discern the relationship between hands and models and lose interest. The rigid nature of the assembly limits where it may be played, and requires a large storage area.

Small toys with internal motor mechanisms to move the toy and power toy appendages are well known as illustrated by U.S. Pat. Nos. 711,323 to Kingsbury and 5,320,573 to Matsayuma. Such toys are generally not suitable as cat toys, for they contain moving parts which are quickly destroyed by a cat and hard surfaces which can result in injury to a cat. Several prior art cat toy devices employ elongated, elastic beams having objects which are intended to entice cats dangled from their distal ends by pieces of string or chain. Some of these devices use beams having proximal ends that are adapted to be hand-held by cat owners so that the owners can dangle and selectively move the objects in front of their cats to keep them entertained.

Other such prior art devices are adapted to be secured to the tops of doors or doorways using snap-on clips. Necessarily, the devices mounted on the tops of doors employ relatively long strings to dangle the objects so that they can be reached by cats on the ground. It is known to use elastic strings for the devices mounted to the tops of doorways so as to increase the dynamic action of the dangled object. However it is not always desirable to mount these types of pet toys only on doors. Generally, doors are located only where entry to or exit from a residence, room, closet, or the like, is required. Pet owners may find it annoying to have to negotiate around dangling strings and objects each time they use doors to which such devices are attached. Additionally, pet owners may simply want to install such devices at places other than where doors are located. For example, an owner may enjoy watching his or her pet play with such a toy, and a door may not be located at a place that is convenient or comfortable for the owner to do so.

One simple cat toy utilizes a single linear spring wire having cat attractive bait fastened to one end thereof while the opposite end is hand held by a person and manipulated in a manner to tempt the cat to play with the toy bait. A device of this general nature is the subject matter of a U.S. Pat. No. D295,798, issued to Boelke on May 17, 1988. While such hand held toys of that or similar nature are known and have proven fairly successful in attracting and fascinating pets, the degree of animation of the bait is limited by the capability of the human operator to manipulate the single wire spring in a myriad of gyrations capable of maintaining the pet's interest. As such, the availability of the toy to the pet depends upon the presence and disposition of a person to play with the pet. It is well know that an object moving under a sheet or other textile is very exciting to cats, but that no prior art devices incorporate such a feature.

Therefore, there is a need for a device that is easy to operate with fully adjustable speed control providing random teasing motions to draw cats into play. Further, such cat toy would have a low center of gravity to prevent tipping. Such a needed device would provide an attractive appearance, and would move erratically under a flexible cover in a manner irresistible to cats. Moreover, such a needed device would be simple to make, lightweight, extremely durable and would remain attractive for long periods of time for a typical pet cat. The needed cat toy would be made of several inexpensive and easily produced parts which would require a relatively minor amount of labor and materials to assembly. The present invention accomplishes these objectives.

SUMMARY OF THE INVENTION

The present device is a cat toy for resting on a flat surface. The cat toy includes a circular shaped housing that contains a motor connected to a power source. The motor has a motor shaft which is preferably generally vertical. A resilient mouse wand is secured at one end thereof with the motor shaft, preferably through a gearing arrangement, thrust bearing arrangement, or the like. The mouse wand further includes a ball and a tail section at a distal end for enticing a cat. A flexible cover at least partially covers the mouse wand such that the cat can see the ball moving under the cover and the tail section protruding from the edge of the cover as the wand moves.

The cat toy further includes a control circuit electronically connected between the motor and the power source that causes the motor to change directions and operate at different speeds, preferably in a seemingly randomly fashion. The mouse wand may be moved 360 degrees around the enclosure and under the cover. The control circuit further includes buttons for changing movement characteristics of the mouse wand, such as speed, direction, erraticity, or the like, and for turning the cat toy on or off.

The present device is easy to operate with an adjustable speed control that provides random teasing motions to draw cats into play. Further, the present invention has a low center of gravity to prevent tipping, is aesthetically attractive, and moves erratically under a flexible cover in a manner irresistible to cats. Moreover, the present device is relatively simple to make, lightweight, extremely durable and remains attractive for long periods of time for a typical pet cat. The device can be made of several inexpensive and easily produced parts which requires a relatively minor amount of labor and materials to assembly. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Figure 1:
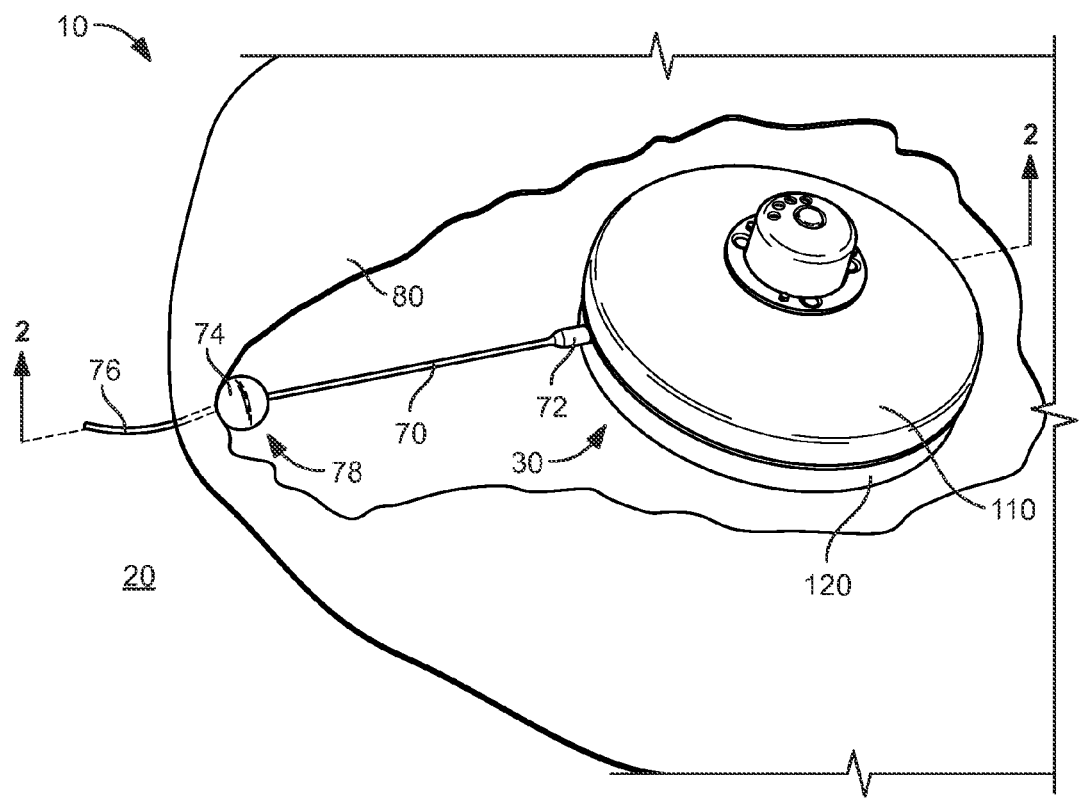
FIG. 1 is a perspective view, partially cut-away, of a cat toy of the invention.
Figure 2:
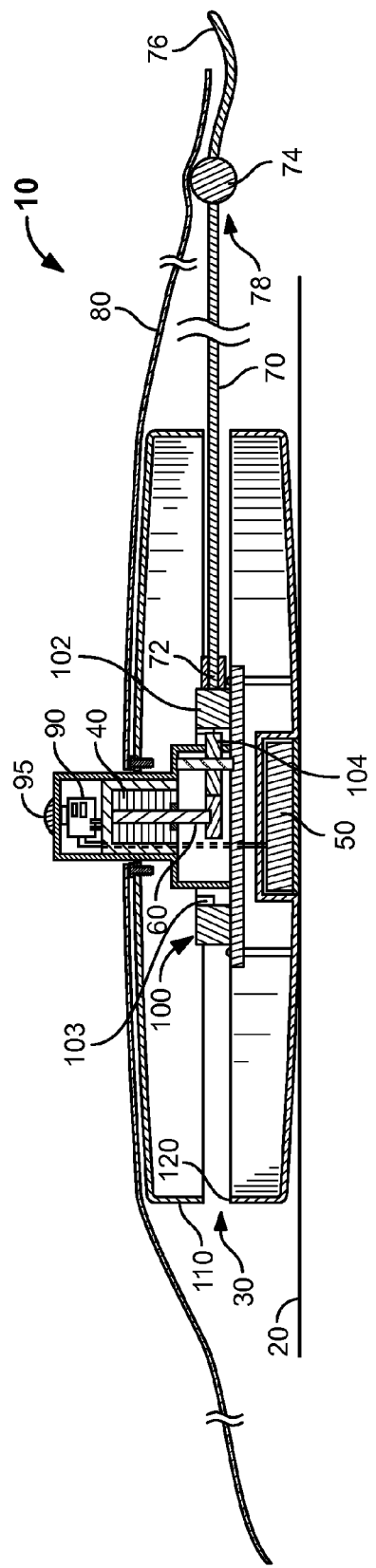
FIG. 2 is a cross-sectional view of the invention, taken generally along lines 2-2 of FIG. 1, and illustrating a mouse wand connected to a motor shaft through a thrust bearing means.

FIGS. 1 and 2 illustrate a cat toy 10 resting on a flat surface 20. The cat toy 10 includes a preferably circular-shaped housing 30 that contains a motor 40 connected to a power source 50, such as a battery. The motor 40 has a motor shaft 60 which is preferably oriented vertically, but could also be arranged in any other direction with proper gearing.

A resilient mouse wand 70 is secured at one end 72 thereof with the motor shaft 60 through a thrust bearing arrangement 100 and gearing arrangement 105. The mouse wand 70 may further include a ball 74 or other protuberance, and a flexible tail section 76 at a distal end 78. A flexible cover 80 at least partially covers the mouse wand 70. The flexible cover 80 may be made of nylon, or other suitable flexible material, and is preferably circular in shape so as to substantially cover the mouse wand 70 and at least a portion of the housing 30 as the mouse wand 70 moves around the housing 30.

An optional AC adaptor 55 (FIG. 4) may be included for recharging the battery 50 when the cat toy 10 is not in use. The cat toy 10 further includes a control circuit 90 (FIGS. 2-4) electronically connected between the motor 40 and the power source 50 that causes the motor 40 to change directions and operate at different speeds, preferably in a seemingly randomly fashion. The mouse wand 70 may be moved 360 degrees around the housing 30 and under the cover 80 (FIG. 5), and the housing may include a plurality of optional legs 132 for additional stability of the housing 30 on the surface 20. The control circuit 90 further includes at least one button 95 for changing the movement behavior of the mouse wand 70, such as the speed, direction, and erraticity of the mouse want 70, and for turning the cat toy 10 on or off. LEDs or other indicators 96 may be included to indicate a behavior mode of the invention as set by the buttons 95.

Figure 3:
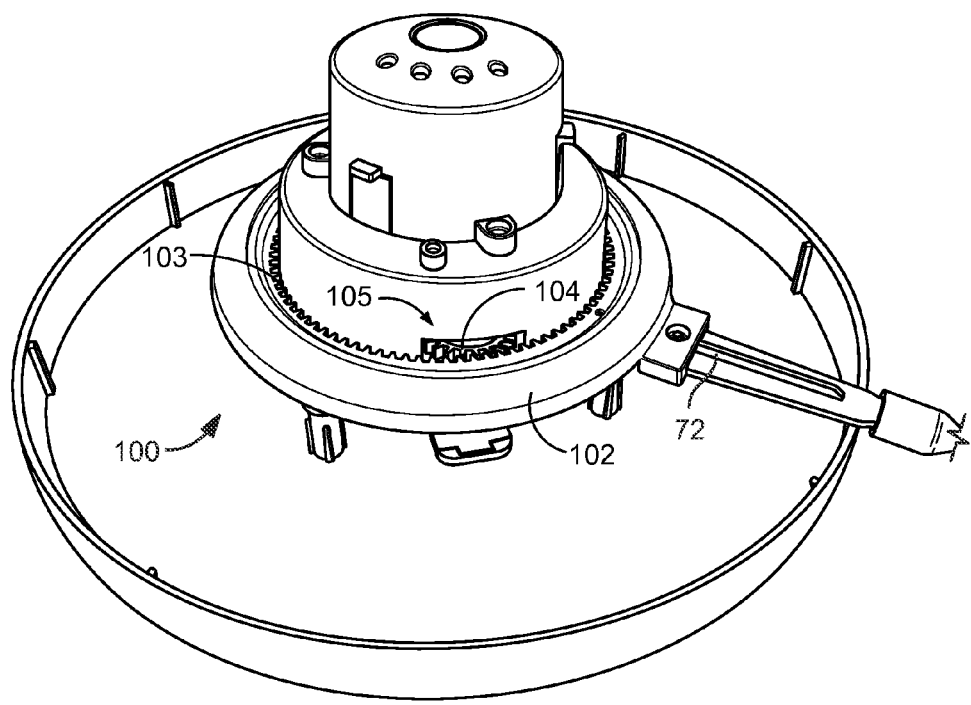
FIG. 3 is a partial perspective view of the invention, illustrating the cat toy of the present invention with a portion of the thrust bearing means removed to expose a gear arrangement that is connected with the motor shaft.
Figure 4:
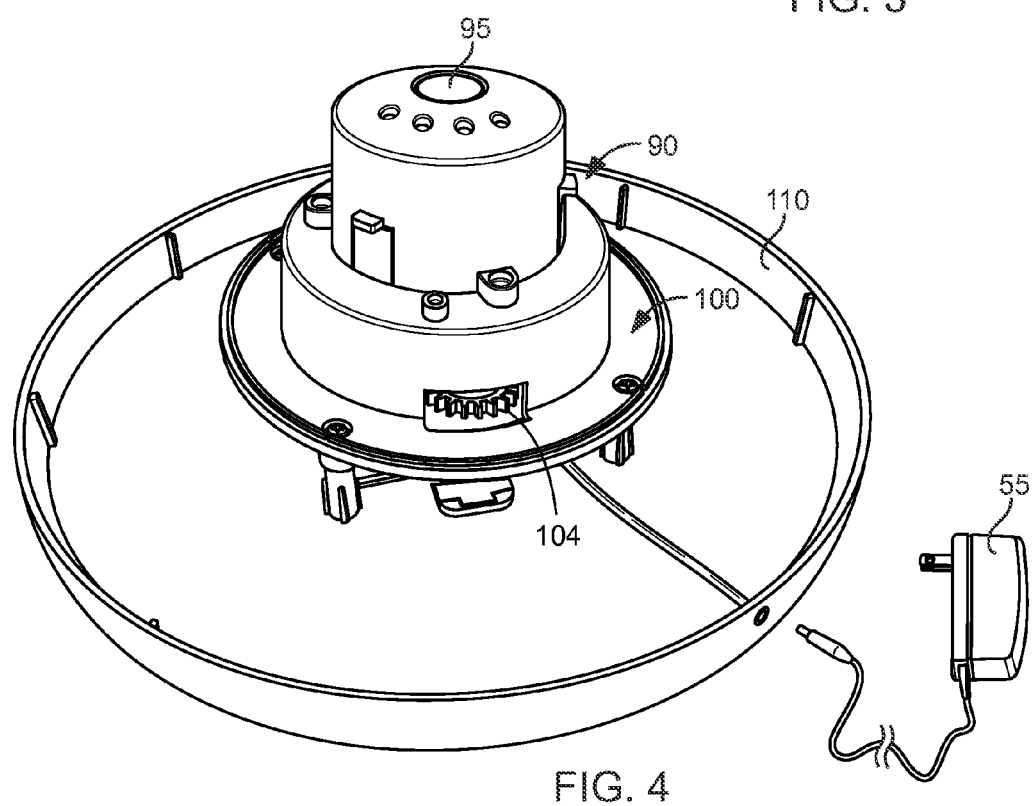
FIG. 4 is a partial perspective view of the invention, illustrating the cat toy of the present invention with a top portion of the enclosure removed to expose the gear arrangement.
Figure 5:
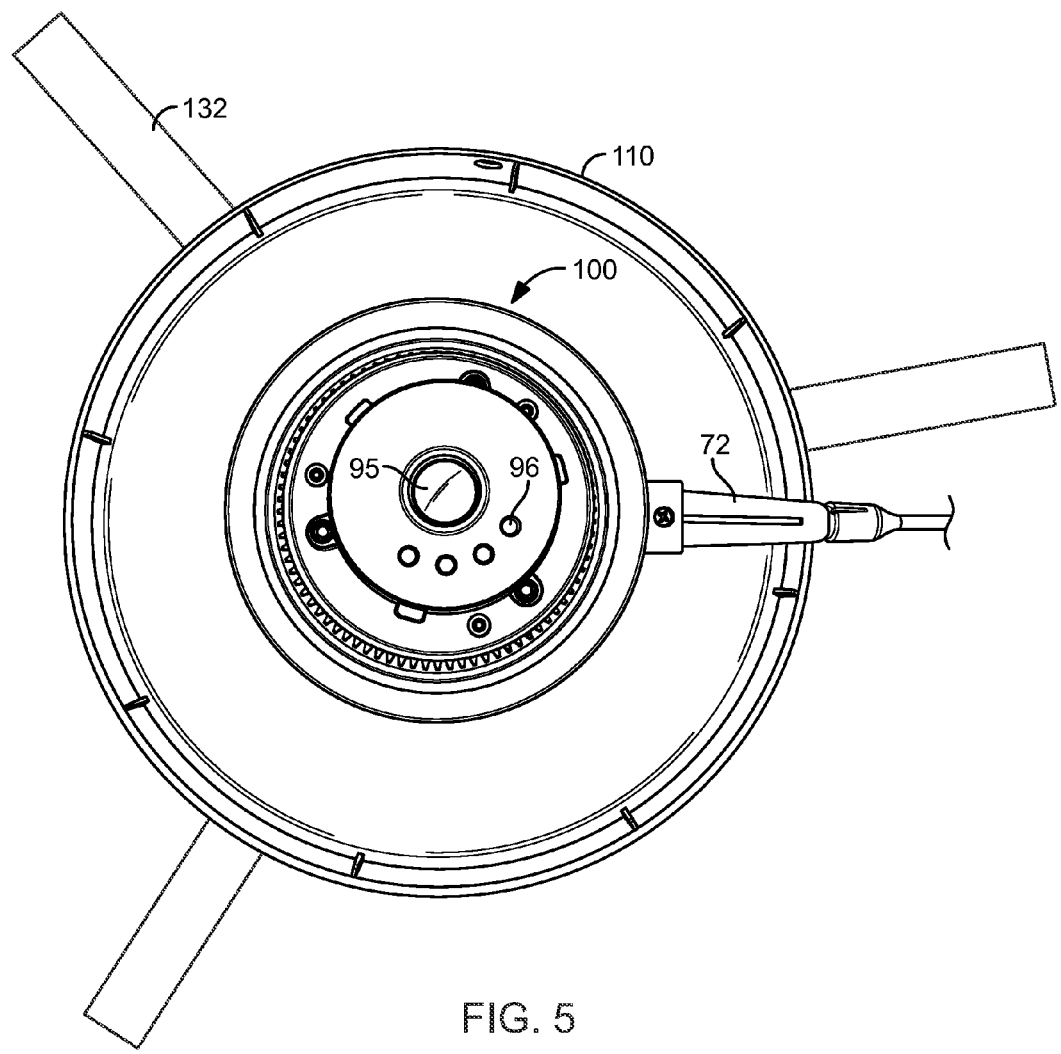
FIG. 5 is a top plan view of the invention, illustrating optional stabilization legs fixed to a housing of the invention.

Preferably the mouse wand 70 is connected with the motor shaft 60 through a thrust bearing means 100 (FIG. 2) and gearing arrangement 105, or the like. In the preferred embodiment, the thrust bearing means 100, motor 40, and at least part of the mouse wand 70 are enclosed in a non-rotating enclosure 110 which has a peripheral slot 120 through which the mouse wand 70 projects. The non-rotating enclosure 110 may include an upper and lower portion, as illustrated. In FIGS. 3-5 the upper portion of the enclosure 110 is removed so that the thrust bearing means 100 and the gearing arrangement 105 may be visible. The peripheral slot 120 is coplanar with the thrust bearing means 100, and may include an outer ring 102 having a gear 103 on an inside surface thereof, the gear driven by a gear 104 fixed to the motor shaft 60 (FIG. 3). Preferably the enclosure 110 is made of a rigid material such as plastic.

While a particular form of the invention has been illustrated and described, it will be apparent that various modifications can be made without departing from the spirit and scope of the invention. For example, the cover 80 may be manufactured with various flexible materials of sufficient strength, or the shape of the housing 30 and/or cover 80 may be changed. Accordingly, it is not intended that the invention be limited, except as by the appended claims.

What is claimed is:

1. A cat toy for resting on a flat surface, comprising:
   a housing having a motor selectively connected to a power source, the motor having a motor shaft;
   a mouse wand secured at one end thereof with the motor drive shaft and extending radially outward from the housing to a free distal end; and
   a flexible cover that extends outward from the housing toward the free distal end of the wand and at least partially covers the mouse wand and contacts a portion of the wand;
   whereby with the power source connected to the motor, the drive shaft changes the radial position of the mouse wand under the cover, and wherein the mouse wand may be moved 360 degrees under the cover.

2. The cat toy of claim 1 wherein the flexible cover is made of nylon.

3. The cat toy of claim 1 wherein the power source is a battery.

4. The cat toy of claim 3 wherein the battery is rechargeable with an AC adapter.

5. The cat toy of claim 1 further including a control circuit that electronically connects the motor and the power source and that causes the motor to selectively change directions and operate at different speeds.

6. The cat toy of claim 1 wherein the mouse wand is connected with the motor shaft through a thrust bearing means.

7. The cat toy of claim 6 wherein the thrust bearing means, motor, and at least part of the mouse wand is enclosed in a non-rotating enclosure, the enclosure having a peripheral slot through which the mouse wand projects, the peripheral slot coplanar with the thrust bearing means.

8. A cat toy comprising:
   a housing adapted to rest on a flat surface;
   a motor connected to the housing, the motor having a motor shaft;

an elongated wand connected with the motor shaft and extending radially outward from the housing to a free distal end thereof, the wand being driven by the motor shaft such that the free distal end of the wand moves along a path around the housing;

a flexible cover that extends radially outward from the housing toward the free distal end of the wand, the flexible cover being draped over at least a portion of the wand and directly contacting the wand as the wand moves relative to the cover around the housing.

9. The cat toy of claim 8 wherein the wand is connected with the motor shaft through a thrust bearing arrangement and gearing arrangement.

* * * * *